United States Patent
Norman et al.

(10) Patent No.: US 10,958,790 B2
(45) Date of Patent: Mar. 23, 2021

(54) VIDEO VOICEMAIL GREETING SYSTEM

(71) Applicants: Alajuwon Omar Norman, San Antonio, TX (US); Alishyante Lavell Alexandria Chavis, San Antonio, TX (US)

(72) Inventors: Alajuwon Omar Norman, San Antonio, TX (US); Alishyante Lavell Alexandria Chavis, San Antonio, TX (US)

(*) Notice: Subject to any disclaimer, the term of this patent is extended or adjusted under 35 U.S.C. 154(b) by 0 days.

(21) Appl. No.: 16/871,636

(22) Filed: May 11, 2020

(65) Prior Publication Data
US 2020/0358903 A1   Nov. 12, 2020

Related U.S. Application Data
(60) Provisional application No. 62/846,658, filed on May 11, 2019.

(51) Int. Cl.
*H04M 3/53* (2006.01)
*H04N 7/14* (2006.01)

(52) U.S. Cl.
CPC .......... *H04M 3/5315* (2013.01); *H04N 7/147* (2013.01)

(58) Field of Classification Search
CPC .................................. H04M 3/53; H04N 7/14
USPC ............................................ 348/14.01–14.16
See application file for complete search history.

(56) References Cited

U.S. PATENT DOCUMENTS

| | | | |
|---|---|---|---|
| 8,265,603 B2 | 9/2012 | Wood et al. | |
| 8,831,573 B2 | 9/2014 | Sigmund et al. | |
| 2001/0050977 A1* | 12/2001 | Gerszber | H04M 1/6505 379/88.13 |
| 2005/0089149 A1 | 4/2005 | Elias | |
| 2006/0034266 A1* | 2/2006 | Harris | H04M 1/72502 370/356 |
| 2007/0064743 A1* | 3/2007 | Bettis | H04L 29/06027 370/503 |
| 2008/0303888 A1* | 12/2008 | Hansson | H04N 7/147 348/14.02 |
| 2009/0154669 A1* | 6/2009 | Wood | H04M 3/53391 379/88.23 |
| 2010/0199340 A1* | 8/2010 | Jonas | G06Q 10/10 726/8 |
| 2012/0315880 A1 | 12/2012 | Peitrow et al. | |
| 2013/0287184 A1* | 10/2013 | Sigmund | H04M 3/42051 379/88.13 |
| 2018/0048765 A1 | 2/2018 | Swanburg et al. | |
| 2019/0028589 A1* | 1/2019 | Schultz | H04M 3/53391 |

* cited by examiner

*Primary Examiner* — Melur Ramakrishnaiah
(74) *Attorney, Agent, or Firm* — Stonebridge IP, PLLC

(57) ABSTRACT

The disclosed audio/video voicemail greeting system provides a user options to have multiple, customized, audio/video voicemail greetings of their choosing in response to a particular call or caller or groups of callers and the ability to choose between the various options in response to an incoming call. Users can create and save a plurality of custom audio/video voicemail greetings and the system allows the user to easily toggle between them in real time in response to an incoming call.

10 Claims, 2 Drawing Sheets

VIDEO VOICEMAIL GREETING SYSTEM

CROSS REFERENCE TO RELATED APPLICATIONS

This application claims priority under 35 USC § 119(e) to U.S. Provisional Application No. 62/846,658 filed May 11, 2019, which is herein incorporated by reference in its entirety.

BACKGROUND OF THE DISCLOSURE

Field of the Invention

The present disclosure relates generally to voicemail systems including video voicemail systems and video greetings for voicemail systems.

Description of the Related Art

Voicemail has traditionally been an audio only feature requiring a telephone connection to a voicemail server. Traditionally, when a voicemail has been left for a user, a user would receive a message waiting notification indicating that a voicemail is available. The user would then have to dial into a voicemail server in order to access and listen to the message. Traditional voicemail, however, is becoming obsolete, due to deficiencies in handling modern communications especially when it comes to business representatives attempting to contact individuals including potential clients to return a phone call.

Statistically, 3 out of 4 callers will hang up on a voicemail system rather than leave a voicemail message with the callee potentially missing out on an important phone call. Such statistics show that a caller will often not leave a voicemail mainly due to receiving an impersonal voicemail message greeting that is made for the general public and that does not provide an attractive interface to the voicemail system for the caller.

Furthermore, current state-of-the-art, voicemail systems have deficiencies, for example, in efficiently handling voicemail for users with large numbers of incoming calls each day. In this situation, calls may be coming in from a variety of sources, e.g., family, friends, work-related, and within each group there may be a variety of different sub groups, for example, different departments, divisions, etc. In this context, it becomes advantageous to tailor voicemail greetings to particular callers and/or groups of callers.

Accordingly, improved voicemail systems and voicemail greeting systems are needed in response to changing uses and requirements of voicemail systems and users.

SUMMARY OF THE INVENTION

The present disclosure provides a system for creating, managing and choosing between an array of recorded in real time or pre-recorded, customized audio/video voicemail greetings, and the ability to leave video voicemail message greetings which are tailored to a caller or group of callers. When a user's phone is contacted by a caller, an interface appears providing, for example, the option to answer, or press "end", to decline the call and send the caller to a generalized voicemail. In addition, in embodiments, the voicemail system of the present disclosure provides several other simultaneous options. For example, the user also has the option to choose between a number of prescreened, saved, voicemail greetings (already saved in their voicemail system) or new greetings which can be created in real time in response to the call. Video voice greetings are available either as greetings already saved in their voicemail system or created on the spot as well. In embodiments, the options for prescreened voicemail greetings and video voicemail greetings can be color-coded and/or labeled numerically.

The voicemail system of the present disclosure provides a system where callers are not limited to one generalized voicemail greeting that is used for a large array of callers that may call their phone. The voicemail system of the present disclosure provides an improved voicemail greeting system where a user can manage voicemail greetings by allowing a user to leave a real time voicemail greeting or video greeting to anyone calling their phone. Furthermore, the audio/video voicemail greeting system of the disclosure provides a user with options to change the audio/video voicemail greeting at any time and as often as they want. There is no limit to how many personalized audio/video voicemail greetings a user can create or delete.

In one embodiment, an audio/video voicemail system including a client device comprising memory and a processor, and a voicemail server comprising memory and a processor, wherein the memory stores instructions which, when executed by the processors, cause the processors to perform operations including receiving a communication from a caller device, determining if the caller device is compatible with the audio/video voicemail greeting system, if the caller device is compatible with the audio/video voicemail greeting system, selecting from a plurality of audio/video voicemail greetings stored in the memory of the voicemail server received from the client device, playing the selected audio/video voicemail greeting stored in the memory of the voicemail server on the calling party's device and recording a voicemail message from the calling party. If the caller device is not compatible with the audio/video voicemail greeting system, Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
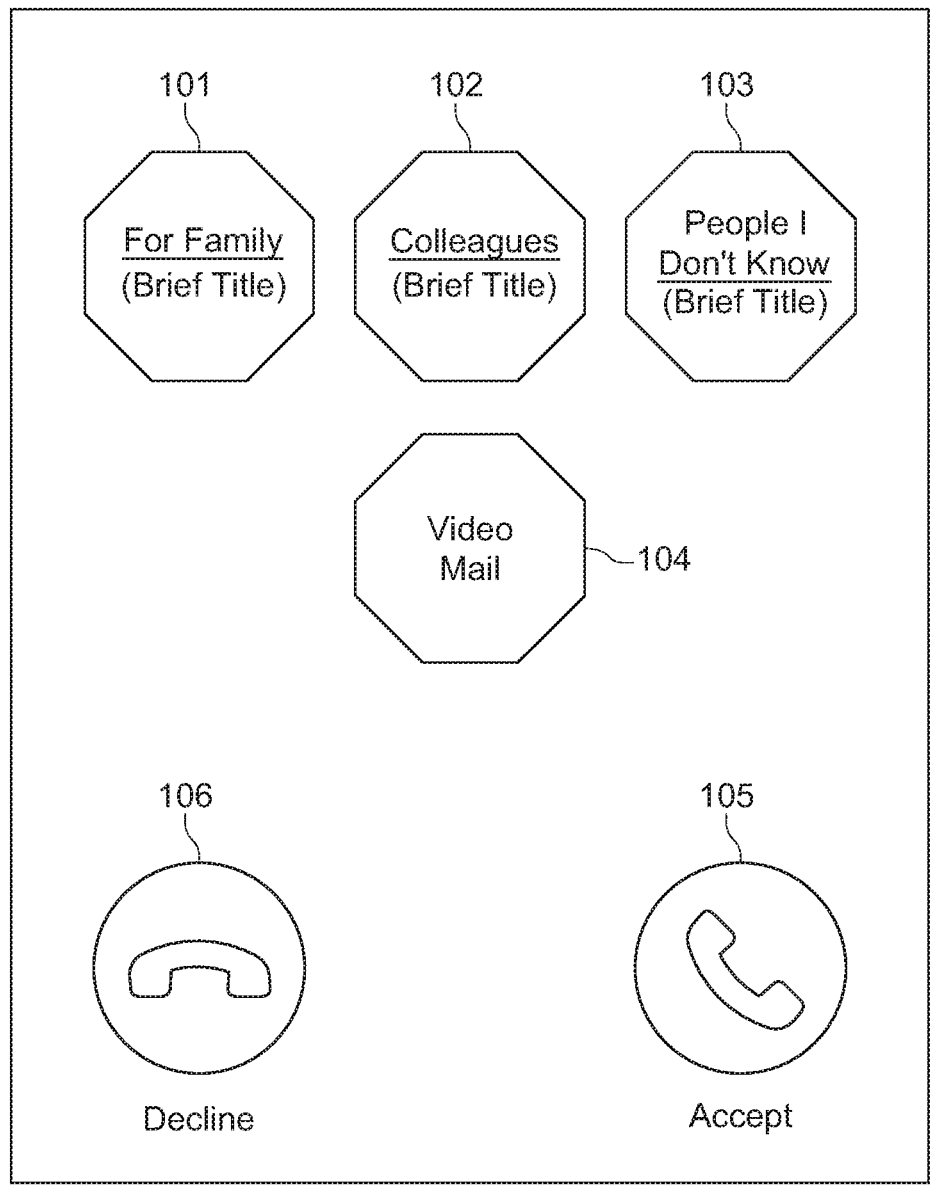
FIG. 1 shows an embodiment of a generalized mobile device screen with an interface of an audio/video voicemail system of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The disclosed audio/video voicemail greeting system provides a user options to have multiple, customized, audio/video voicemail greetings of their choosing in response to a particular call or caller or groups of callers and the ability to choose between the various options in response to an incoming call. Users can create and save a plurality of custom audio/video voicemail greetings and the system allows the user to easily toggle between them in real time in response to an incoming call. As described herein, an audio/video voicemail greeting contains both an audio and a video component. An audio voicemail greeting would contain only audio.

In one embodiment, a user will open the voicemail system application settings on their mobile device and click to open the user's multi-voicemail or video voicemail options. The user can then choose how many types of voicemail greetings or video voicemail greetings they would like to create. After the voice/video voicemail greetings are created, they can be saved on a voicemail server and become available for an incoming call.

When a client device is called, a voicemail system interface appears, while the phone is ringing, and options to answer, decline, or choose an audio/video voicemail greeting is presented. The user may choose to answer or leave a personalized greeting either from the saved greetings or created in real time. Voicemail greetings can be edited or changed at any time. The audio/video voicemail system of the disclosure can be used on all face-to-face video-based communication devices and applications as well as all video chat devices and applications as well.

The present disclosure provides a system where a voicemail communications session is established and used to provide various content to a voicemail client on, for example, a mobile device. One option includes the establishment of multiple communication sessions in order to obtain messaging, multimedia, and other content associated with a voicemail greeting at a mobile device. Another option provides that all such content is obtained or accessed by a voicemail server and transmitted to a mobile device or any other communication device as well. The client mobile device may provide voicemail client data to a voicemail server enabling the voicemail server to modify content as needed such that it is compatible with the mobile device.

In embodiments, the present disclosure provides a voicemail system for a mobile device that allows users to send and receive 'self-deleted' audio/video voicemail greetings or if the user wants to give the caller or texter the option to download/save, they can. Photos and videos may be taken. The voicemail system of the disclosure may use the mobile device's camera to capture videos, in embodiments, up to several minutes long and may also use Wi-Fi technology. The voicemail system of the disclosure also allows the sender to draw or insert text on the video voicemail greeting and determine how many seconds or minutes the recipient can view it before the video disappears (or is deleted) from the recipient's device.

In embodiments, video voicemail greetings may only be viewed once (although this is a user changeable option) and in embodiments during the viewing period the recipient must maintain contact with the device's touchscreen or the video voicemail may disappear.

In embodiments, when a caller sends a communication to a user with the voice mail system of the disclosure, if the caller has the voicemail system of the disclosure on their device, the caller will see a video voicemail greeting from the user with the option of leaving a voicemail message to the user. The video voicemail greeting will generally only show on the caller screen, and will not be saved to the caller's device, and will be immediately deleted upon viewing. In embodiments, the user may provide the option to the caller of downloading and saving the video voicemail greeting as well.

The video voicemail system of the disclosure thus includes the possibility of sending video voicemail greetings to callers wherein the caller only views the video voicemail greeting and does not leave a voicemail message. In some cases, a user may want to send a message or greeting, or some other information, to a caller and not necessarily expect a voicemail message be left in return. As mentioned, the user has an option of allowing the caller to download and save the message greeting or not.

If the caller does not have the video voicemail system application of the disclosure on their device, in embodiments, the video voicemail system will send the caller a text message with the video greeting attached. In other embodiments, the video voicemail system of the disclosure may send the video through other social media applications including but not limited to Facebook, Instagram, Zoom, Skype, Google voice, etc.

In embodiments, features called "Live Mail Stories" may be provided. Live mail stories may include compilations of videos that create a narrative or special 'what is going on' in a small business, professional, and or personal user's life. For example, if a small business within a local area is offering specials, have an early store closure, or whatever the case may be, consumers can be dialed in right to that small business as they appear in chronological order. Every video voicemail greeting may have the choice to have a combination of photos, videos, graphics, and illustrations, such as stickers. Each compilation contains snaps that a user has posted to the user's story or business story for as long as they want. They also have the option to change. Each appears for a given period of time, e.g. 24 hours, and the user's friends can view them an unlimited number of times before they expire.

Memories may be a personalized album of videos, pictures, multimedia, etc., and stories that a user can download and save. The ability to reshare these archived multimedia collections is provided. Portrait lenses, also known as animated filters, may also be provided. With these features, a user can create a selfie that distorts his or her image. Examples of popular filters include those that transform users into dogs, shoot lasers from their eyes, place a crown of flowers on their heads, as examples.

A client mobile device can be a multimode handset. While this description includes a general context of computer-executable instructions, the present disclosure can also be implemented in combination with other program modules and/or as a combination of hardware and software. Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

A mobile device may include a display for displaying multimedia such as, for example, text, images, video, and functions, such as, visual voicemail data, caller ID data, setup options, menus, messages, wallpaper, graphics, and the like.

The mobile device can include one or more processors for controlling, and/or processing data. A memory can interface with the processor for the storage of data and/or applications. Memory can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by a mobile device.

Memory can be configured to store one or more applications. Applications can also include a user interface (UI) application. The UI application can interface with a client (e.g., an operating system) to facilitate user interaction with device functionality and data, for example, recording audio and/or video greetings, sending recorded audio and/or video greetings to a voice mail server, answering/initiating calls, entering/deleting data, configuring settings, address book manipulation, multimode interaction, and the like.

Applications can include other applications, such as, for example, a visual voicemail application, an audio recording application, an audio processing application, a video recording application, a video processing application, add-ons, plug-ins, a voice recognition application, a call voice processing application, an SMS messaging application, an MMS messaging application, an e-mail messaging application, an instant messaging application, an image processing application, a music application, combinations thereof, and the like, as well as subsystems and/or components. Applications can be stored in the memory and/or in firmware, and can be executed by one or more processors. Firmware can also store code for execution during initialization of the device. A communications component can interface with a processor to facilitate wired/wireless communications with external systems including, for example, cellular networks, VoIP networks, LAN networks, etc.

A voicemail system can include a server comprising, for example, volatile and/or nonvolatile memory and one or more processors that is configured to handle calls received at a voicemail system and a storage server comprising, for example, volatile and/or nonvolatile memory that is configured to store at least one voicemail account and at least one or more audio/video greetings and one or more audio/video greeting identifiers associated with the at least one voicemail account.

FIG. 1 shows an embodiment of a generalized mobile device screen with an interface of the voicemail system of the disclosure that appears in response to an incoming call. FIG. 1 illustrates customized messages/options that appear on a client interface when a user is receiving a call. The system allows the option for the caller to leave a voicemail.

FIG. 1, 101 shows an option for a voicemail message greeting for 'family members'. FIG. 1, 102 shows an option for voicemail message greetings for a group of contacts categorized as 'colleagues'. FIG. 1, 103 shows an option for voicemail message greetings for a group of contacts categorized as 'people I don't know'. FIG. 1, 104 shows an option for leaving a customized video voicemail greeting. FIG. 1 further shows options for accepting 105 or declining 106 an incoming call.

Figure 2:
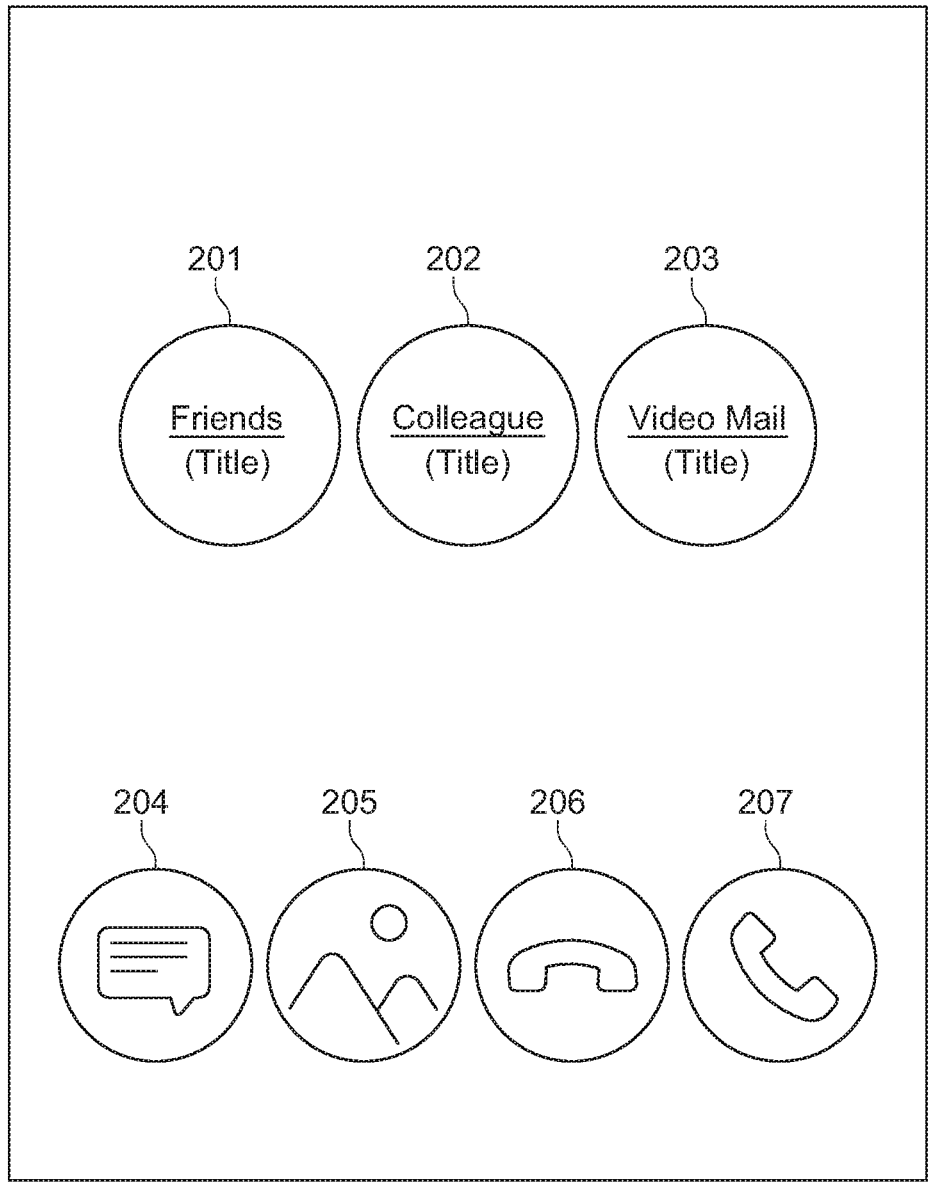
FIG. 2 shows an embodiment of an interface for the audio/video voicemail system of the disclosure.

FIG. 2 shows a generalized interface for a cellular telephone, mobile communication device, personal digital assistant, or laptop that appears in response to an incoming call. FIG. 2, 201, shows an option for voicemail greeting message choice for a group of contacts labeled 'friends'. FIG. 2, 202 shows an option for voicemail greeting message choice for a group of contacts labeled 'colleague'. FIG. 2, 203 shows an option to leave a customized video voicemail greeting which may be created in real time in response to a call. FIGS. 2, 204, 205, 206, and 207 show video toggle options in an embodiment of a user interface.

While this disclosure includes specific examples, it will be apparent after an understanding of the disclosure of this application has been attained that various changes in form and details may be made in these examples without departing from the spirit and scope of the claims and their equivalents.

We claim:

1. An audio/video voicemail system comprising:
   a client device comprising memory and a processor;
   a voicemail server comprising memory and a processor;
   wherein the memory stores instructions which, when executed by the processors, cause the processors to perform operations comprising:
   receiving a communication from a caller device;
   determining if the caller device has the audio/video voicemail greeting system on the caller device;
   if the caller device has the audio/video voicemail greeting system, selecting from a plurality of audio/video voicemail greetings stored in the memory of the voicemail server received from the client device;
   playing the selected audio/video voicemail greeting stored in the memory of the voicemail server on the calling party's device;
   optionally recording a voicemail message from the calling party; and
   deleting the audio/video voicemail greeting from the caller device immediately after it is played on the caller device or providing the caller with the option of downloading the audio/video voicemail greeting onto the caller device after it is played.

2. The audio/video voicemail system of claim 1, further comprising,
   if the caller device has the audio/video voicemail greeting system on the caller device, the client device creating a video voicemail greeting in response to the call,
   the client device sending the video voicemail greeting to the voicemail server, and
   playing the created video voicemail greeting on the caller device.

3. The audio/video voicemail system of claim 1, wherein if the caller device does not have the audio/video voicemail greeting system on the caller device, the selected audio/video voicemail greeting is sent to the caller device as an attachment to a text message.

4. The audio/video voicemail system of claim 1, further comprising an interface on the client device that displays, in response to an incoming call, one or more audio/video voicemail greeting options for groups of callers included in the contacts on the client device.

5. The audio/video voicemail system of claim 4, further comprising an option for a caller that is not a contact on the client device.

6. The audio/video voicemail system of claim 1, further comprising an interface on the client device that displays video toggle options for an audio/video voice mail greeting.

7. The audio/video voicemail system of claim 1, wherein the voicemail system is for a video chat communication system, a video conference system, or group video system.

8. The audio/video voicemail system of claim 1, wherein the caller device comprises a touchscreen and the caller must maintain contact with the touchscreen, or the audio/video voicemail greeting is deleted from the caller device.

9. The audio/video voicemail system of claim 1, wherein the audio/video voicemail greeting is deleted from the caller device immediately after it is played.

10. The audio/video voicemail system of claim 1, wherein the audio/video voicemail greeting is downloaded onto the caller device after it is played.

\* \* \* \* \*